United States Patent [19]

Machado et al.

[11] Patent Number: 5,369,180
[45] Date of Patent: Nov. 29, 1994

[54] MISCIBLE POLYKETONE POLYMER BLEND

[75] Inventors: Joseph M. Machado, Richmond; Raymond N. French, Missouri City, both of Tex.

[73] Assignee: Shell Oil Company, Houston, Tex.

[21] Appl. No.: 748,404

[22] Filed: Aug. 22, 1991

[51] Int. Cl.$^5$ .................. C08G 67/02; C08L 25/12
[52] U.S. Cl. ..................... 525/185; 525/539
[58] Field of Search .................. 525/185, 539

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,780,140 | 12/1973 | Hammer | 525/185 |
| 4,812,522 | 3/1989 | Handlin, Jr. | 525/185 |
| 4,843,144 | 6/1989 | Van Broekhoven et al. | 528/392 |
| 4,880,903 | 11/1989 | Van Broekhoven et al. | 528/392 |
| 4,900,789 | 2/1990 | Gergen | 525/185 |
| 4,956,412 | 9/1990 | Gergen et al. | 525/185 |

FOREIGN PATENT DOCUMENTS 2149932  3/1973  France .
1081304  8/1967  United Kingdom .

OTHER PUBLICATIONS

Olabisi, Olagoke; Lloyd M. Robeson and Montgomery T. Shaw. Polymer-Polymer Miscibility. Academic Press, New York (1979). pp. 196–211.

Primary Examiner—James J. Seidleck
Assistant Examiner—Thomas Hamilton, III
Attorney, Agent, or Firm—Denise Y. Wolfs

[57] ABSTRACT

Improved compositions comprise miscible polymer blends of a linear alternating polymer of carbon monoxide and at least one ethylenically unsaturated hydrocarbon with a styrene/acrylonitrile copolymer rich in acrylonitrile.

19 Claims, No Drawings

MISCIBLE POLYKETONE POLYMER BLEND

FIELD OF THE INVENTION

This invention relates to polyketone polymer blends, and, more particularly, to miscible blends of a polyketone and styrene/acrylonitrile copolymers which are rich in acrylonitrile.

BACKGROUND OF THE INVENTION

The class of polymers of carbon monoxide and olefins has been known for some time. U.S. Pat. No. 2,495,286 (Brubaker) discloses such polymers of relatively low carbon monoxide content produced in the presence of free radical initiators, e.g., peroxy compounds. G.B. 1,081,304 discloses similar polymers of higher carbon monoxide content produced in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium the anion of a non-hydrohalogenic acid having a pKa of below about 6 and a bidentate ligand of phosphorus.

The resulting polymers are a class of polyketone polymers which possess an attractive set of properties for a variety of applications. The utility of these polymers can be further broadened by selectively blending polyketone polymers with other materials which have complimentary property sets. Most often this is accomplished with polymer blends which are immiscible (heterogeneous) on the molecular scale, yet well dispersed (compatible) on the macroscopic scale.

Immiscible, though compatible, blends are the most common polymer mixture. However, on rare occasions, polymer pairs will form miscible blends. The term miscible will be used herein to describe a mixture of two or more polymers that form a single-phase solution (solid or liquid) on a molecular scale within the amorphous phase. When one or both of the polymer blend components is capable of forming both a crystalline and an amorphous phase, then the term miscible refers only to the amorphous phase in which the separate components are capable of mixing on the molecular level. Miscibility can be achieved by selecting components that interact with one another in an attractive mode (e.g. which mix exothermically).

Several methods can be used to determine miscibility in polymer blends. For example, when a film is prepared from a miscible blend, it is usually optically clear, while immiscible blend films are usually opaque. However, this criterion is not useful when one of the blend components crystallizable. The most commonly used criterion for miscibility is the existence of a single glass transition temperature for a given miscible blend. This parameter is relatively easy to measure for amorphous systems, and rapid if a technique such as differential scanning calorimetry is used. Greater sensitivity, especially useful for semi-crystalline blends, can be obtained when dynamic mechanical methods are employed to measure the glass transition temperature. As the relative proportion of components changes, a smooth change between the glass transition temperatures for the pure blend components and the glass transition temperatures for the various blends will be observed over the miscible range for the blends.

It is an object of this invention to provide a miscible blend of a polyketone polymer and a second polymer.

SUMMARY OF THE INVENTION

The present invention provides miscible polymer blends of a linear alternating polymer of carbon monoxide and at least one ethylenically unsaturated hydrocarbon (i.e. a polyketone polymer) with a copolymer of a vinyl aromatic monomer, such as styrene, and an acrylonitrile monomer, wherein the copolymer is rich in acrylonitrile. Such vinyl aromatic/acrylonitrile copolymers contain greater than about 45 wt % acrylonitrile, preferably greater than about 50 wt % acrylonitrile, and most preferably greater than about 55 wt % acrylonitrile, yet less than the amount that would preclude melt processing of the acrylonitrile-enriched styrene/acrylonitrile copolymer with the polyketone polymer. The invention also provides a method of suppressing the melting point of a polyketone polymer, thereby broadening its processing window, by incorporating into the polyketone polymer a copolymer of a vinyl aromatic monomer and an acrylonitrile monomer, wherein the copolymer is rich in acrylonitrile.

DETAILED DESCRIPTION OF THE INVENTION

Molecularly miscible blends are herein defined as blends which can be mixed such that they exhibit only one glass transition temperature, indicating a single amorphous phase. More specifically, molecularly miscible blends exhibit one glass transition temperature as measured by thermal analysis using a differential scanning calorimeter.

It has been found in accordance with this invention that the desired molecularly miscible blends can be obtained by blending together a compatible mixture of a polyketone polymer with a vinyl aromatic/acrylonitrile copolymer, particularly a styrene/acrylonitrile copolymer, rich in acrylonitrile.

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The poller chain of the preferred polyketone polymers is therefore represented by the repeating formula

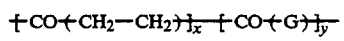

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO —(CH$_2$CH$_2$)— units and the —CO —(G)— units are found randomly throughout the polymer chain, and preferred ratios of y:x are from about 0.01 to about 0.1. The end groups or "caps" of the polymer chain will depend upon what materials were present during the production of the polymer and whether or how the poller was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The second component of the blends of the invention is a copolymer of a vinyl aromatic monomer and an acrylonitrile monomer, enriched in the acrylonitrile monomer. The copolymers typically have an acrylonitrile content of greater than about 45 wt %, preferably greater than about 50 wt %, and most preferably greater than about 55 wt %, yet less than about 80 wt % acrylonitrile, based on total copolymer.

The vinyl aromatic monomer component of the copolymer is preferably of the formula

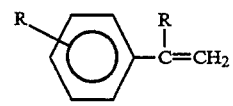

wherein R independently is hydrogen or alkyl of up to 2 carbon atoms inclusive. Illustrative of such vinyl aromatic compounds are styrene, α-methylstyrene, α-ethylstyrene, o-methylstyrene, and p-ethylstyrene, and mixtures thereof. Styrene and α-methylstyrene are preferred vinyl aromatic compounds of the above formula, and styrene is particularly preferred.

The acrylonitrile monomer component of the copolymer is represented by the formula:

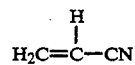

The copolymers of a vinyl aromatic monomer and an acrylonitrile monomer suitable for use in this invention preferably contain less than about 80 wt % acrylonitrile, based on the weight of copolymer. The copolymer is preferably an amorphous copolymer, but some crystallinity is acceptable as long as the melting point of the copolymer is less than about 250° C. Such copolymers can be melt processed with polyketone polymers without exhibiting stability problems.

Copolymers of a vinyl aromatic monomer with alkenylnitrile monomers other than acrylonitrile are not useful in this invention. It is speculated that the miscible blends of the invention result from interactions between the acrylonitrile portions of the copolymer and the ketone portions of the polyketone polymer, while the styrene portions of the copolymer are non-interactive. It is therefore surprising that a polymethacrylonitrile polymer shows no miscibility with the polyketone polymer. While not wishing to be bound by any particular theory, it is speculated that the interactions leading to miscibility involve weak hydrogen bonding between the ketone portion of the polyketone polymer and the hydrogen atom on the middle carbon atom shown in the above formula for acrylonitrile. Polymethacrylonitrile contains a methyl group in place of this hydrogen atom, which apparently prevents the interactions which result in miscibility with a polyketone polymer. Similarly substituted acrylonitrites, such as polyethacrylonitrile, would also be expected to be non-miscible with polyketone polymers.

Non-miscible blends of a polyketone polymer and a copolymer of a vinyl aromatic monomer and an alkenyl nitrile monomer are disclosed in U.S. Pat. No. 4,956,412 (Gergen et al.). The copolymer employed therein has an alkenyl nitrile content below about 40 wt % of the copolymer, and preferably from about 20 wt % to 35 wt % of the copolymer. Although the blends are described as uniform mixtures, with the copolymer dispersed within the polyketone polymer, the blends are also specifically described as non-miscible.

The blends of the invention may also include additives such as antioxidants and stabilizers, dyes, fillers or reinforcing agents, fire resistant materials, mold release agents, colorants and other materials designed to improve the processability of the polymers or the properties the resulting blend. Such additives are added prior to, together with subsequent to the blending of the polyketone and the copolymer.

The method of producing the blends of the invention is not material so long as a miscible blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped articles. Illustrative applications are the production of articles useful in both rigid and flexible packaging, both internal and external parts for the automotive industry, and structural parts for the construction industry.

The invention is further illustrated by the following Examples which should not be regarded as limiting.

EXAMPLE 1

A linear alternating terpolymer of carbon monoxide, ethylene, and propylene (88/022) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.78 dl/g when measured in m-cresol at 60° C. The polyketone polymer also contained 0.5% Irganox 1076.

EXAMPLE 2

Blends were prepared of the polyketone terpolymer of Example 1 and a styrene/acrylonitrile copolymer rich in acrylonitrile, SAN58. an experimental material obtained from Monsanto. The SAN58 was a random copolymer, prepared by free radical polymerization, containing 58 wt % acrylonitrile monomers and 42 wt % styrene monomers. The blends and neat polymer control samples were prepared by the co-precipitation of 3 wt % polymer blend solutions in hexafluoroisopropanol into a ten-told excess of distilled water with rapid stirring. The precipitates were washed with distilled water and dried under vacuum at 70° C. for about 24 hours.

The samples were then subjected to thermal analysis using a Seiko differential scanning calorimeter. The samples were scanned from −150° C. to 275° C. at a rate of 20° C./min. They were then quenched to −150° C. and rescanned to 275° C. at 20° C./min. The glass transition temperature for each sample was calculated upon the second heating.

The miscibility of the two blend components was demonstrated by the glass transition temperatures for the blends. The blends each exhibited a single glass transition temperature, increasing in a nearly linear fashion from the glass transition temperature of polyketone to the glass transition temperature of SAN58, based on the relative proportions of the blend components, as shown in Table 1.

TABLE 1

| Composition (Polyketone/SAN58) | Glass Transition Temperature (°C.) | |
|---|---|---|
| | Experimental | Predicted |
| 100/0 | 12 | 12 |
| 75/25 | 38 | 32 |
| 50/50 | 66 | 54 |
| 25/75 | 84 | 80 |
| 0/100 | 111 | 111 |

The experimentally observed glass transition temperatures were also compared with those predicted by the Fox equation for a miscible polymer pair:

$$\frac{1}{Tg_{blend}} = \frac{w_1}{Tg_1} + \frac{w_2}{Tg_2}$$

wherein w represents the weight fraction of each component ant Tg represents the glass transition temperature (in degrees Kelvin) for each component. The agreement between the experimental values and the predicted values is excellent, and confirms the miscibility of the blends.

The blends also exhibited a cold-crystallization exotherm, immediately following the glass transition upon heating, the total enthalpy of which increased with SAN58 content. The results indicated that SAN58 is fully miscible with the amorphous phase of polyketone polymer, and that the kinetics of crystallization of polyketone are retarded by the presence of SAN58 in the melt. This effect is typical of a miscible crystalline/amorphous polymer pair. The phenomenon may be useful to produce an amorphous or "quenched" polyketone material in cases where optical transparency is desired.

EXAMPLE 3

A 50/50 blend of the polyketone polymer of Example 1 and a polymethacrylonitrile homopolymer, obtained from Scientific Polymer Products, was prepared by the coprecipitation of 3 wt % polymer blend solutions in hexafluoroisopropanol into a ten-fold excess of distilled water with rapid stirring. The precipitate was washed with distilled water and dried under vacuum at 70° C. for about 24 hours.

The 50/50 blend sample was then subjected to thermal analysis using a Seiko differential scanning calorimeter, as described in Example 2. The blend exhibited two glass transition temperatures, one at 25° C. (representing the polyketone component of the blend), and one at 110° C. (representing the polymethacrylonitrile component of the blend). Thus, the thermal analysis results indicated a non-miscible blend.

What is claimed is:

1. A miscible polymer blend composition comprising:
   a linear alternating polymer of carbon monoxide and at least one ethylenically unsaturated hydrocarbon, and
   a copolymer of a vinyl aromatic monomer and an acrylonitrile monomer, wherein the copolymer contains from greater than about 45 wt % to less than about 80 wt % acrylonitrile monomer, based on weight of copolymer.

2. The composition of claim 1 wherein the linear alternating polymer is represented by the repeating formula

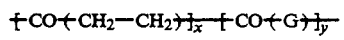

wherein G is a moiety of an ethylenically unsaturated hydrocarbon of at least 3 carbon atoms polymerized through the ethylenic unsaturation and the ratio of y:x is no more than about 0.5.

3. The composition of claim 2 wherein the copolymer contains from greater than about 50 wt % to less than about 80 wt % acrylonitrile monomer, based on total weight of copolymer.

4. The composition of claim 2 wherein the vinyl aromatic monomer is styrene or α-methylstyrene.

5. The composition of claim 3 wherein, in the linear alternating polymer, G is a moiety of propylene and the ratio of y:x is from about 0.01 to about 0.1.

6. The composition of claim 3 wherein, in the linear alternating polymer, y is zero.

7. The composition of claim 2 wherein the copolymer contains from greater than about 55 wt % to less than about 80 wt % acrylonitrile monomer, based on total weight of copolymer.

8. The composition of claim 7 wherein the vinyl aromatic monomer is styrene or α-methylstyrene.

9. The composition of claim 7 wherein, in the linear alternating polymer, G is a moiety of propylene and the ratio of y:x is from about 0.01 to about 0.1.

10. The composition of claim 7 wherein, in the linear alternating polymer, y is zero.

11. A miscible polymer blend composition comprising:
    a linear alternating polymer of carbon monoxide and at least one ethylenically unsaturated hydrocarbon, wherein the linear alternating polymer is represented by the repeating formula

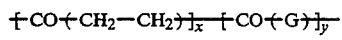

wherein G is a moiety of an ethylenically unsaturated hydrocarbon of at least 3 carbon atoms polymerized through the ethylenic unsaturation and the ratio of y:x is no more than about 0.5, and
    a copolymer of a vinyl aromatic monomer of the formula

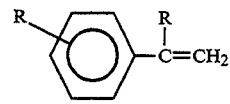

wherein R independently is hydrogen or alkyl of up to 2 carbon atoms inclusive, and an acrylonitrile monomer, wherein the copolymer contains from greater than about 50 wt % to less than about 80 wt % acrylonitrile monomer, based on weight of copolymer.

12. The composition of claim 11 wherein the copolymer contains from greater than about 55 wt % to less than about 80 wt % acrylonitrile monomer, based on total weight of copolymer.

13. The composition of claim 12 wherein the vinyl aromatic monomer is styrene or α-methylstyrene.

14. The composition of claim 13 wherein, in the linear alternating polymer, G is a moiety of propylene and the ratio of y:x is from about 0.01 to about 0.1.

15. The composition of claim 13 wherein, in the linear alternating polymer, y is zero.

16. A method for depressing the melting point of a linear alternating polymer of carbon monoxide and at least one ethylenically unsaturated hydrocarbon, wherein the linear alternating polymer is represented by the repeating formula

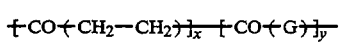

wherein G is a moiety of propylene and the ratio of y:x is from about 0.01 to about 0.1, by incorporating therein an effective amount of a copolymer of a vinyl aromatic monomer and an acrylonitrile monomer, wherein the copolymer contains from greater than about 45 wt % to less than about 80 wt % acrylonitrile monomer, based on weight of copolymer.

17. The composition of claim 16 wherein the copolymer contains from greater than about 50 wt % to less than about 80 wt % acrylonitrile monomer, based on total weight of copolymer.

18. The composition of claim 17 wherein the vinyl aromatic monomer is styrene or α-methylstyrene.

19. The composition of claim 16 wherein the copolymer contains from greater than about 55 wt % to less than about 80 wt % acrylonitrile monomer, based on total weight of copolymer.

* * * * *